United States Patent [19]

Zingher

[11] Patent Number: 4,639,881

[45] Date of Patent: Jan. 27, 1987

[54] DATA INPUT UNIT AND METHOD FOR PRINTING MACHINES

[75] Inventor: Oded Zingher, Muhlweg, Fed. Rep. of Germany

[73] Assignee: M.A.N.-Roland Druckmaschinen AG., Fed. Rep. of Germany

[21] Appl. No.: 499,860

[22] Filed: Jun. 1, 1983

[30] Foreign Application Priority Data

Jun. 1, 1982 [DE] Fed. Rep. of Germany ....... 3220622

[51] Int. Cl.[4] ...................... G06F 15/626; G09G 3/02

[52] U.S. Cl. .................................... 364/521; 340/706; 340/712; 364/188; 364/518; 364/709

[58] Field of Search ............... 364/518, 519, 521, 709, 364/188; 340/703, 712, 365 VL, 707, 722, 365 C; 101/DIG. 24–26

[56] References Cited

U.S. PATENT DOCUMENTS

| | | | |
|---|---|---|---|
| 3,857,022 | 12/1974 | Rabane et al. | 364/514 |
| 4,200,932 | 4/1980 | Schramm et al. | 364/519 |
| 4,286,289 | 8/1981 | Ottesen et al. | 340/712 |
| 4,305,071 | 12/1981 | Bell et al. | 340/712 |
| 4,359,222 | 11/1982 | Smith, III et al. | 340/711 |
| 4,377,049 | 3/1983 | Simon et al. | 340/365 |
| 4,396,977 | 8/1983 | Slater et al. | 364/188 |
| 4,413,314 | 11/1983 | Slater et al. | 340/722 |
| 4,451,895 | 5/1984 | Sliwkowski | 364/188 |
| 4,495,651 | 1/1985 | Froeliger | 340/712 |

FOREIGN PATENT DOCUMENTS 3100451 1/1982 Fed. Rep. of Germany .

OTHER PUBLICATIONS

"Bogenoffsetmaschinen", brochure, MAN-Roland AG, (Apr. 82), (no translation).
"Roland RCI and CCI Systems Standardize Print Quality", MAN-Roland AG, (Dec. 81).
"Heidelberger CPC System", Heidelberger Druckmaschinen AG, (May 82).

*Primary Examiner*—Gary Chin
*Assistant Examiner*—Kevin J. Teska
*Attorney, Agent, or Firm*—Leydig, Voit & Mayer

[57] ABSTRACT

A remote control terminal for a printing machine has a single central display for indicating all machine functions and accepting operator input of all the control information and which is easily used by a machine operator of ordinary skill. The control terminal has a transparent matrix switch and a machine diagram template overlayed on a color monitor under computer control. Control of the printing machine is a hierarchal process starting from the selection of a machine status area indicated on the machine diagram. Fault signals, however, are indicated directly and automatically for immediate operator attention. Selected correction possibilities are offered so that the operator does not need to investigate the possible location or cause of the defect. Machine functions and subsystems are color coded on the machine diagram. Similarly, machine data is color coded to distinguish input areas, set points, measured values, adjustments, and legends and messages. Thus, it is not necessary for the machine operator to observe all of the machine parameters, and instructions or inputs cannot be fed unchecked or accidentally to the control system.

57 Claims, 14 Drawing Figures

DATA INPUT UNIT AND METHOD FOR PRINTING MACHINES

BACKGROUND OF THE INVENTION

This invention relates to remote control stations for printing machines.

Currently printing machines such as offset printing presses are remotely controlled from a central control terminal or control desk. Control information and machine parameters are passed from the control terminal to the printing press through one or more microcomputers monitoring and adjusting printing function such as register and ink density. See, for example, Schramm et al. U.S. Pat. No. 4,200,932 issued Apr. 29, 1980, for which a reexamination certificate issued Apr. 26, 1983. Currently all of the major printing machine manufacturers sell similar remote control systems, each of which has a rather elaborate control terminal or control desk.

A typical remote control desk has indicators in the form of rows of emitting diodes, luminous switches, digital indicators or screens, and input units in the form of keyboards or selector switches. Depending on the data indicated by the rows of LEDs or the digital display, the operator activates any number of the keys on the control unit. In addition to manufacturers' literature, control units are described in patents such as West German Pat. No. 2,728,738.

If displays and input devices such as keyboards are provided for each control function, the operators are compelled to switch repeatedly between different displays and inputs. Such a control terminal also uses an excessive number of mechanical components and occupies a great deal of space.

To reduce the operator time required to switch from one set of input and display devices to another, it is known to centralize controls for the printing machine and to reduce duplication of devices as taught in West German Pat. No. 3,100,451. A central control panel includes adjustment units for the fountain roller drives and the printing register, along with a separate control unit for remote adjustment of the inking zones. But switching facilities are required for the operations to fix the operating range, and hence a large number of controls are still required.

It is also known how to use visual display units, which operate with the aid of a light pen for the control and monitoring of machines. The light pen, for example, can select various steps or branches on a flow diagram displayed, in whole or in part, on the screen of the visual display unit. A particular disadvantage of using a light pen for machine control is that the light pen includes a photoelectric cell which is susceptible to dirt and other environmental effects. Hence work places using light pens sensing video display screens should be enclosed in clean areas away from production printing machines to ensure reliable operation of the control and monitoring system. See, for example, page 634 of Druck-Print No. 10/1980, pp. 633–635, wherein video displays are used in the press room office.

Recently a substitute for the light pen has been developed consisting of a transparent, touch sensitive matrix sensor or switch which may be placed over the screen of a visual display unit. The combination of a touch sensitive matrix and visual display unit, for example, has been used as the operator interface of a Xerox 5700 copying machine. See, for example, FIG. 4, page 2326, and FIG. 5, page 2327 of SBZ/JIS, No. 40, 1981, pp. 2324–2328.

It is apparent, however, that the mere use of a video display unit with a light pen or touch-sensitive matrix does not provide access to the numerous inputs and outputs that are currently provided on the remote control terminal for a printing machine. This should be evident from the fact that a single screen cannot by itself display all of the information required by a printing machine operator to supervise and control printing operations.

SUMMARY OF THE INVENTION

The primary object of the present invention is to provide a remote control terminal for a printing machine having a single central display for indicating all machine functions and accepting operator input of all the control information and which is easily used by a machine operator of ordinary skill.

Another object is to provide a machine-operator interface for a printing machine having a low resolution graphics display yet also indicating printing machine areas in high resolution pictorial format.

Still another object of the invention is to provide an improved method for supervising printing machine functions from a central location wherein a machine operator of ordinary skill and without extensive training is intuitively guided to specific operator sequences providing access to subsets of related machine parameters.

In accordance with the invention, a system comprising a color video display under computer control, having a transparent touch-sensitive matrix sensor overlayed on the display screen, provides oparator access to all machine parameters for supervision and control of a printing machine. This system accomplishes the objects of the invention by various combinations of at least four primary features. First, indicators, inputs, and fixed high-resolution graphics are combined in a centralized, low cost remote control terminal including an overlay of the transparent pressure-sensitive matrix, a high-resolution graphics template, and the display screen thereby providing a high density of input-output information. Second, the machine operator is guided through specific operating sequences (i.e., display building and interactive subroutines) providing systematic organization of data and acceptance of operator input after the operator responds to indicated positions on a machine diagram or pictorial representation of the particular printing machine. In other words, supervision or control of the printing machine is in accordance with a hierarchal process initiated from the machine diagram and leading to specific operating sequences controlling interactive input and output via the control terminal. Preferably changes from one subset of related machine parameters or machine status area to another can be made only via the machine diagram, which is used only for the selection of specific operating sequences. The specific operating sequences present and accept only the required and permissible input data for corresponding machine status areas. Third, both machine status areas indicated on the machine diagram and input-output alphanumeric data are color coded as to general function and purpose so that an unskilled operator quickly adapts to the input-output methodology. Different printing machines may employ the same standardized color codes so that an operator familiar with the color codes and methodology can switch from one machine to another different machine without reference to verbal or written instructions. Fourth and finally, fault signals are indicated directly and automatically on the machine diagram. Preferably the current operating sequence is interrupted and correction possibilities are offered, so that the operator does not need to investigate the possible location or cause of the defect. Preferably only images relating to a delimited process or part thereof are indicated for input purposes.

BRIEF DESCRIPTION OF THE DRAWINGS

Other objects and advantages of the invention will become apparent upon reading the attached detailed description and upon reference to the drawings in which.

While the invention has been described in connection with certain preferred embodiments, it will be understood that there is no intention to be limited to the particular embodiment shown, but the intention is, on the contrary, to cover the various alternative and equivalent constructions included within the spirit and scope of the appended claims.

MODES FOR CARRYING OUT THE INVENTION

Figure 1:
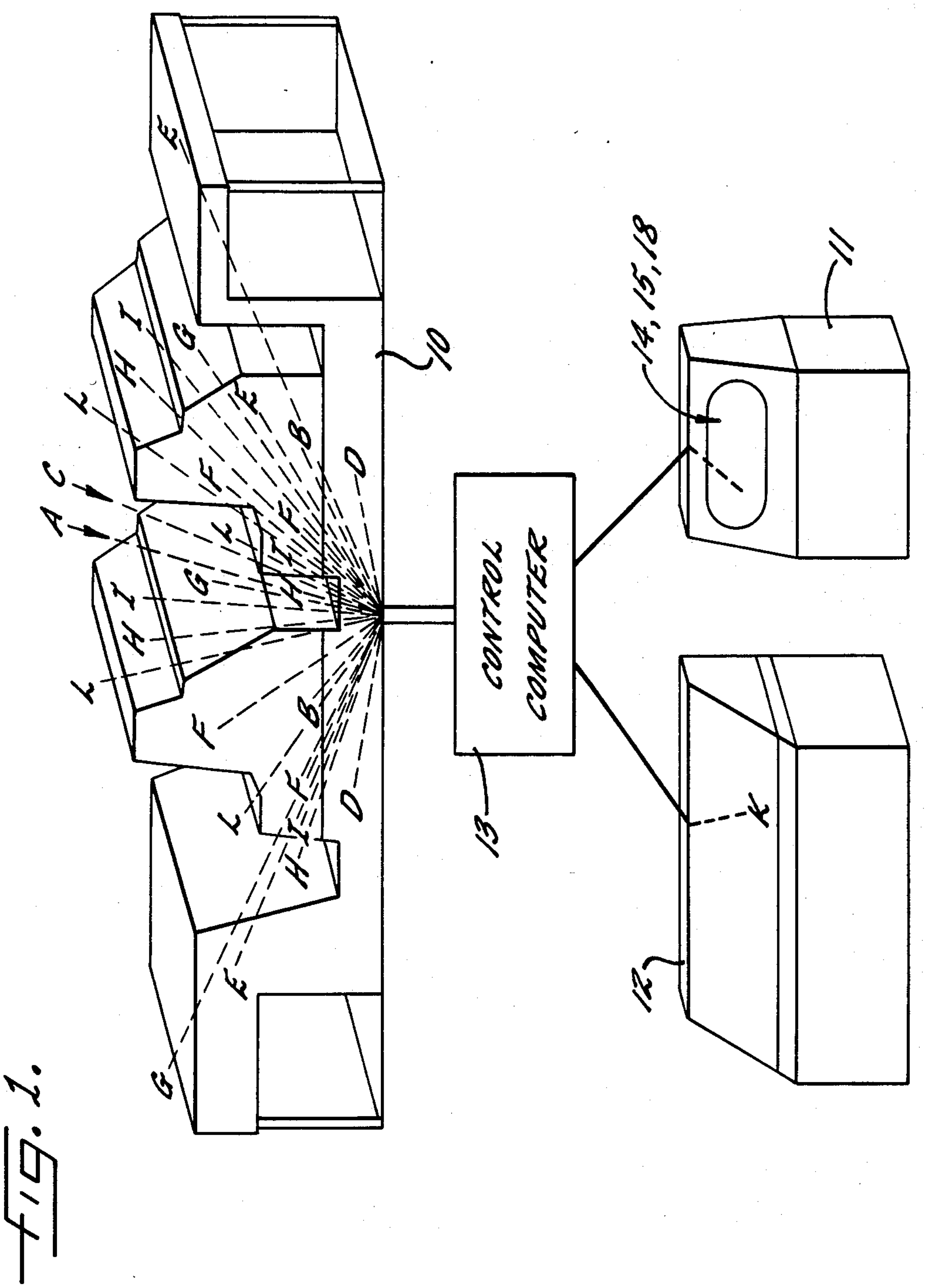
FIG. 1 is a schematic diagram showing the relationships between the monitoring and control equipment in the printing system according to the invention.

Referring now more particularly to the drawings, there is shown in FIG. 1 a printing press 10 linked to a control terminal 11 and a matching ink densitometer table 12 via a control computer 13. The control terminal 11 has transparent pressure-sensitive switch matrix 14 overlayed on a video display screen 15 for providing input and output, respectively, between the machine operator and the control terminal. In other words, the operator can remotely control printing operations from the terminal 11 when the control computer 13 is executing a suitable control procedure. See, for example, Schramm et al. U.S. Pat. No. 4,200,932 issued Apr. 29, 1980, for which a reexamination certificate issued on Apr. 26, 1983.

It should be noted that even for a relatively simple printing machine such as the two-color offset press 10 shown in FIG. 1, there are a large number of control functions that must be supervised. These control functions are associated with the press drive A, the lubricant supply B, the air supply C, the dampening supply D, sheet travel E, register adjustment F, safety devices G, inking units H, dampening units I, densitometers K, and ink slides L. It should also be noted that many of these controlled or monitored functions are performed at a plurality of places in the printing machine 10, or at the remote ink densitometer desk 12. Hence, all of the control information cannot be presented on the screen 15 of the remote control terminal 11 at any given time. The applicant has discovered, however, a particularly advantageous method for providing simplified access to the monitoring and control functions by machine operators of ordinary skill, working from the control terminal 11.

Figure 2:
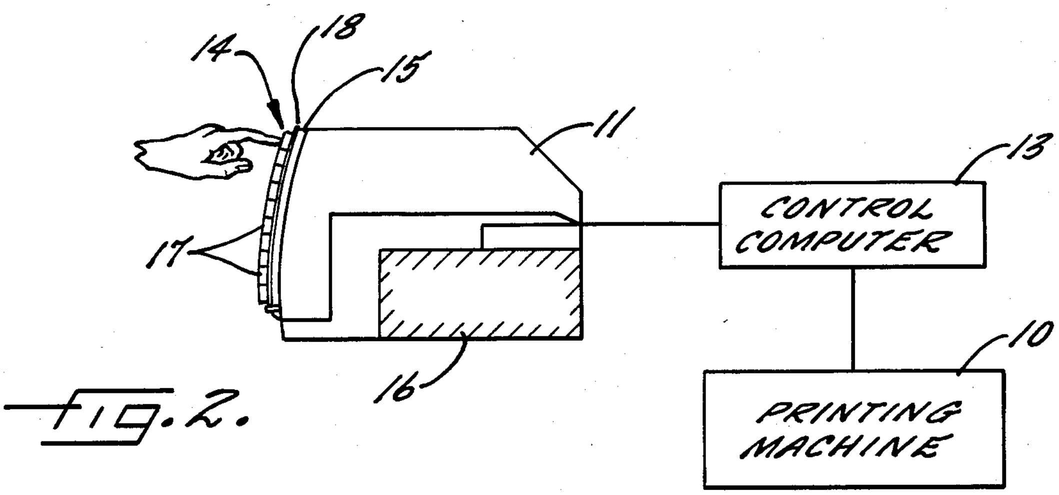
FIG. 2 is a schematic diagram showing the pressure-sensitive sensor or switch matrix and graphics template overlayed on the visual display unit of the control terminal.

As more particularly shown in FIG. 2, the transparent matrix sensor 14 has a matrix or grid of individual sensors or switches 17 responsive to pressure. Since the matrix or grid 14 is positioned in a predetermined relation with respect to the face 15 of the video display, correlation is possible between the visual display 15 and the sensor matrix 14. Selective pressure, for example, on a specific point 17 of the sensor matrix 14 produces a signal corresponding to the row and column coordinates of the particular point or element of the matrix. The signal is transmitted to the control computer 13 for suitable adjustment of the printing machine 10. Preferably the sensor or switch matrix 14 has its signals convey to an intermediate control unit 16 which processes the signals to generate the coordinates explicitly so that the coordinates are passed to the control computer 13. The control unit 16, in other words, scans the matrix 14 until selective pressure is detected. Then, the control unit 16 determines the row and column coordinates of the selected element and passes the coordinates to the control computer 13. It should be noted that to assist the operator in finding the individual elements or cells of the sensor matrix 14, the display 15 is activated by the control computer 13 to generate a suitable character or graphics symbol at the most sensitive points or locations 17 of the sensor matrix 14. Moreover, not all of the matrix elements may be so indicated; rather, only a predetermined subset of the matrix elements are indicated as valid inputs to perform predetermined control functions. These control functions are further defined by suitable symbols or legends written on the display 15 by the control computer 13.

Figure 3A:
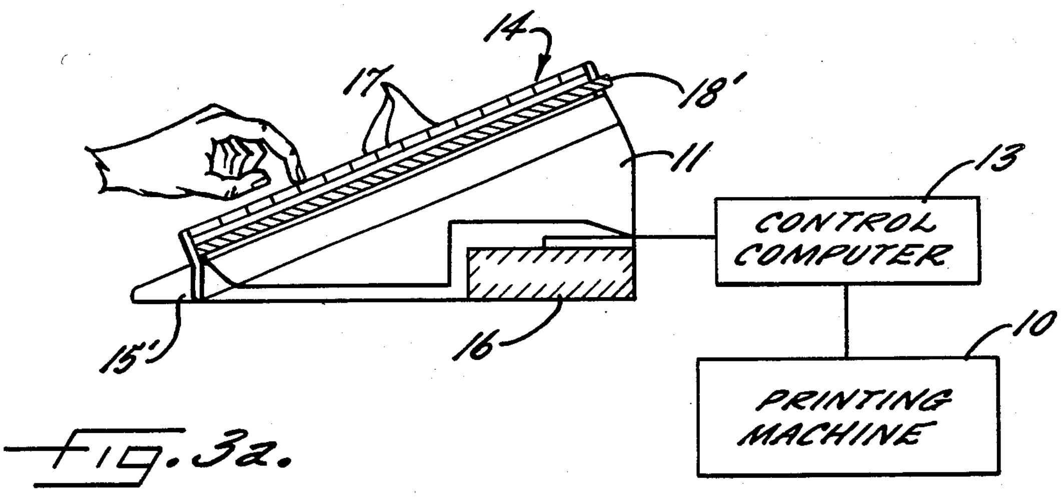
FIG. 3A is a side view of an alternative embodiment of the control terminal employing an easily changeable template.
Figure 3B:
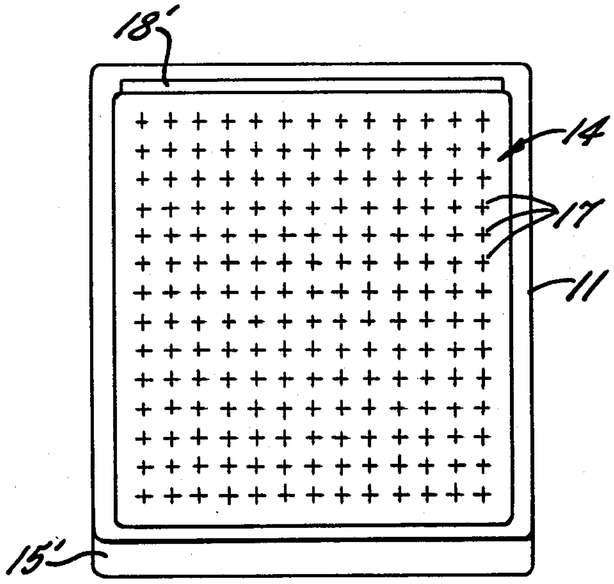
FIG. 3B is a plan view of the alternative embodiment shown in FIG. 3A.

To further define the sensitive points on the sensor matrix 14 and also to enhance the resolution of the picture conveyed to the operator without requiring a high resolution video display 15, a suitable graphics template or transparency 18 is also overlayed on the face 15 of the video display. The video display 15, for example, is a cathode ray tube. An alternative configuration of FIG. 3B may also be used having a replaceable template 18' and a flat display 15'. The display 15', for example, is a plasma display.

In general, the measured values of machine functions A–L are fed from the printing press 10 to the control terminal 11 and the video display 15. These values relate to the operating condition of the printing machine 10 and in particular may indicate faults in motor operation, sheet travel, or control and safety equipment which require immediate attention. In response to the fault signals, an indicating image appears immediately on the visual display 15, preferably coincident with an audible alarm signal, along with necessary input possibilities to remedy the fault. The input possibilities, in other words, identify particular matrix elements 17 for operator selection and indication of permissible remedies. Such remedies are initiated by finger contact on an indicated input area or element 17 on the sensor matrix 14. In other words, the operator intuitively responds to a signal on the video display 15 to command corrective action.

Figure 4:
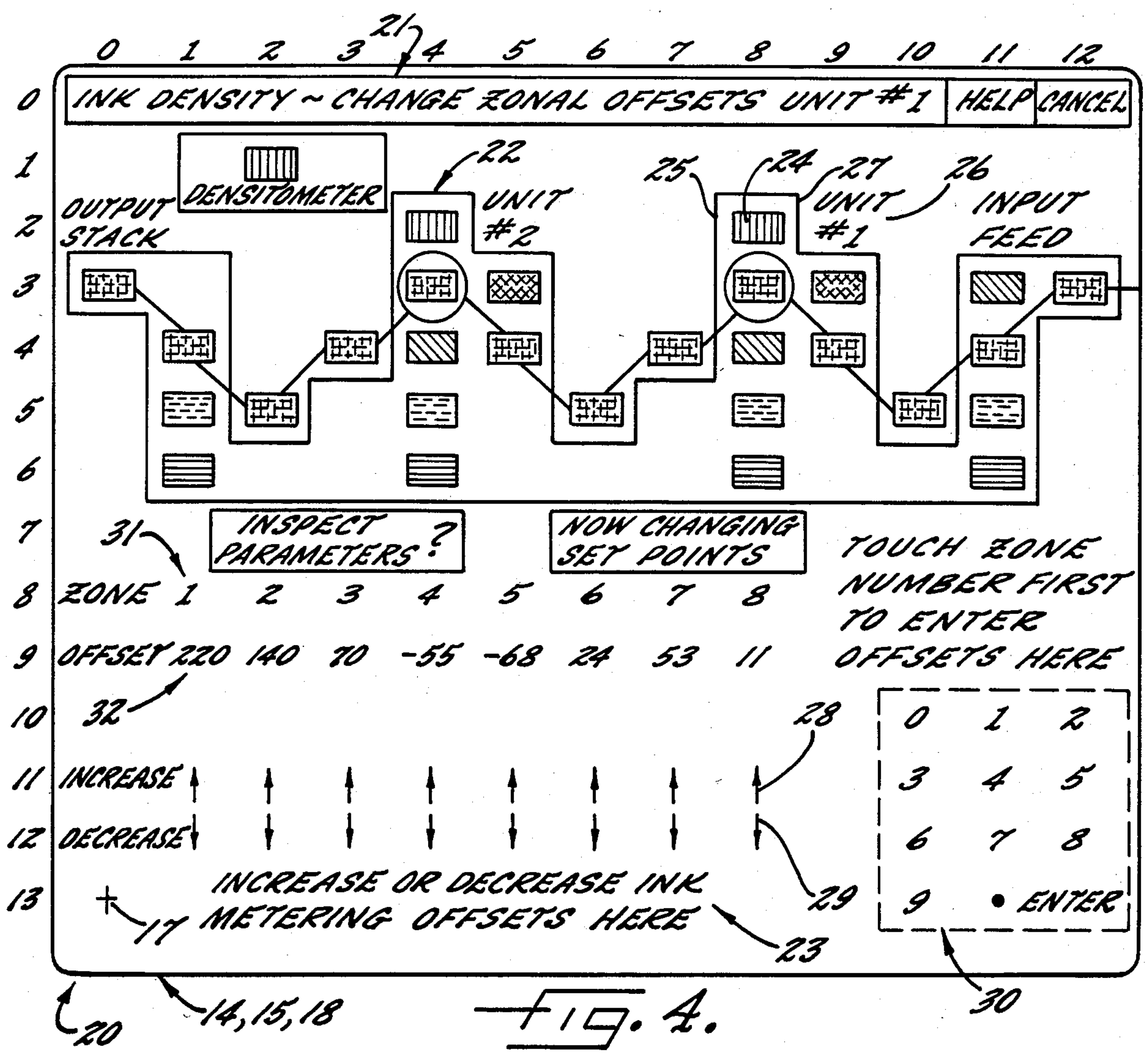
FIG. 4 is a pictorial representation of the face of the video display showing the locations of the transparent matrix switch elements and a highly schematic template representing the printing machine under remote control, and further comprising an uppermost prompting section, an upper machine diagram specified in part by the template and indicating machine status areas, and a bottom interactive area including a phantom keyboard, and a numeric display and input section corresponding to an operating sequence for the supervision and control of zonal ink density adjustments.

Turning now to FIG. 4, there is shown a particularly advantageous arrangement of symbols displayed on the template 18 and display 15 used in conjunction with a preferred method for supervising printing machine functions. The machine operator is intuitively guided to specific operating sequences providing access to subsets of related machine parameters. The image generally designated 20 is comprised of three sections; an uppermost prompting area 21, an upper machine diagram 22, and an interactive area 23. A particular functional unit A–L in a particular area of the printing machine 10 is indicated by a graphic symbol 24 on the display 15 in the machine diagram 22. The symbol 24 indicates the sensitive point of the matrix element 17 for selecting a specific operating sequence to request interactive input and output with respect to the particular location or machine status area referenced to the machine diagram. The color of the graphic symbol 24 also identifies the particular function or relationship between machine parameters associated with the respective location or machine status area on the machine diagram 22.

Figure 5:
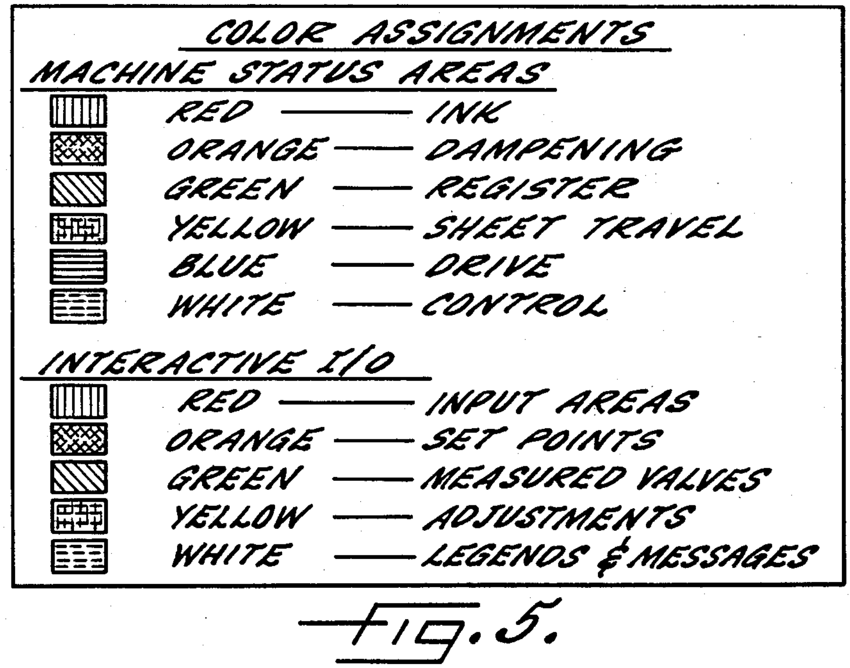
FIG. 5 is a color assignment table describing the functions indicated by various colors displayed in the machine diagram or the interactive input-output area of the video display.

Shown in FIG. 5 is a color assignment table including the color codes for the machine status area symbols 24. A color of red, for example, represents an inking function, orange represents a dampening function, green represents a register control function, yellow indicates sheet travel, blue indicates drive components, and white indicates control components such as an electronic or pneumatic system. It should also be noted that the machine diagram 22 has a plurality of machine status areas corresponding to each function or color. Moreover, the printing machine 10 is comprised of an input feed, a number of printing units, and an output stack which are labeled on the template 18. These labels 26 may be illuminated when a particular unit is selected by activation of any indicated matrix switch associated with the lables 26. As shown in FIG. 4, for example, if the operator applies pressure to the switch matrix above the symbol 24, the display 20 responds by illuminating the unit No. 1 annotation 26 and also by displaying the "INK DENSITY-CHANGE ZONAL OFFSETS UNIT NO. 1" prompt statement 21 at the top of the display. Preferably the graphic symbol 24 is also modified, for example by changing the color of the bordering area 27 to indicate which particular machine status area was selected by the operator. This is important, for example, for machine functions such as the paper path which occurs at a number of distinct places or machine status areas for each printing unit. Moreover, the color of the message in the prompting area 21 should also correspond to the color of the graphic symbol 24 and the selected machine status area. Thus the operator can tell which particular machine status area and function has been selected merely by glancing at the top half of the display 20. It should be noted that for the sake of illustration the number of matrix elements 17 has been limited to 13×12 or 156 elements. The size of the individual switch matrix element 17 are limited by the size of one's finger to about the size shown, but it should be noted that the display 20 itself can be much larger. The switch matrix 14, for example, could have at least 24 rows and 32 columns of elements 17.

The machine diagram 22 can also have much more resolution and detail than is shown in FIG. 4. This should be evident from the fact that the machine diagram 22 is made up in part by the template 18 which can have a much higher resolution and detail than can be displayed on the video display 15. Moreover, it is desirable for the details of the machine diagram 22 to be in numerous colors, for example the parts in each printing unit conveying or printing colored ink can be colored with the color of the respective ink. By using the template 18 to provide the detail of the machine diagram 22, the video display 15 need not have high resolution graphics capability. Rather, the display 15 need only have "character graphics" capability for displaying alphanumeric symbols and a limited set of graphics symbols, each graphic symbol making up, for example, a substantial fraction of the space alotted to the alphanumeric characters. The graphic symbols, in other words, are comprised of a number of the pixels or raster elements making up the alphanumeric characters. In practical terms, this means that the video display 15 may be provided merely by a raster scan video terminal such as a television set driven by a microcomputer of the personal computer variety having a color graphics capability. Thus a high resolution graphics display is not required. Alternatively, however, a high resolution graphics capability terminal could be used so that the machine diagram 22 could be computer generated instead of being provided in part by a template 18.

Once the operator has designated a particular machine status area, the interactive input-output area 23 of the display 20 is activated to present to the operator an indication of the machine conditions corresponding to the designated machine status area and to provide for the entry or modification of set points to adjust or control the machine functions for the designated machine status area. Shown in FIG. 4 is the information generated by the video display 15 to enable the operator to inspect the zonal offsets of the ink dosing or metering elements and to manually increase or decrease the ink metering offsets by applying pressure to the switch matrix 14 at the location specified by the upward 28 or downward 29 arrows. Alternatively, the operator is presented with the option of directly entering the offsets via a phantom keyboard 30.

It should be noted that the characters and graphic symbols for the interactive input-output portion 23 of the display 20 are also color coded as indicated in FIG. 5 to designate the function or purpose of the information conveyed by the characters or symbols. If, for example, the matrix elements 17 above a particular symbol or character is active for receiving input from the user, then it is displayed in a red color. Thus, the up and down arrows 28, 29 are displayed in red. Similarly the phantom keyboard 30 is also displayed in red, after one of the zone numbers 31, displayed in red, is pressed. The offset numbers 32 are set points and are colored orange. Measured values are colored green and adjustments are colored yellow, but neither measured values nor adjustments are included in the display 20 of FIG. 4. The legends and messages in the interactive input-output area 23 are white.

Each machine status area may have more than one associated interactive display. By depressing the red question mark on the "INSPECT PARAMETERS" input, for example, a table is displayed including the measured ink density values, ink key adjustments, ink key set points, and the offsets for each printing zone.

Figure 6:
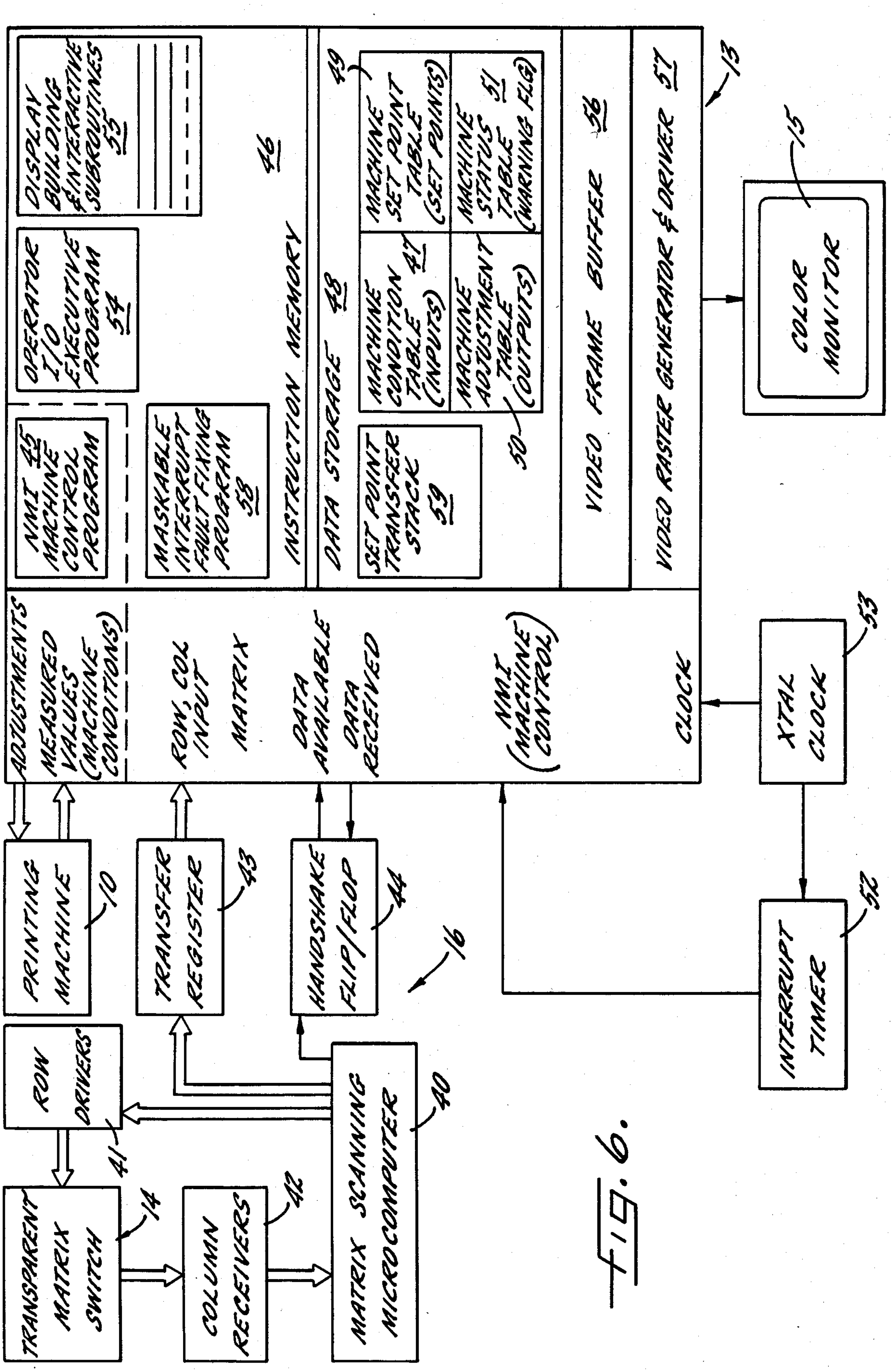
FIG. 6 is a system block diagram corresponding to the schematic diagram in FIG. 2 or FIGS. 3A and 3B.

A block diagram of the hardware and software for performing the display and input-output functions is shown in FIG. 6. The matrix scanning control unit 16 is comprised of a separate matrix scanning microcomputer 40 which is interfaced to the transparent matrix switch 14 by a set of row drivers 41 and a set of column receivers 42. Although the transparent matrix sensor or switch 14 may use any number of kinds of sensors, preferably it is a low cost matrix switch of the type having a sandwich of mylar sheets, a top mylar sheet carrying rows of conductors and a bottom sheet carrying columns of conductors, and contact between the row conductors and column conductors occurring through apertures in the middle mylar sheet at the intersecting areas of the conductors only when pressure is applied. Such matrix switches are in general use having printed conductors of silver ink. Although silver conductive ink is not transparent, thin films of gold, semiconductive films of tin oxide, or semiconductive organic films may be used as transparent conductors.

The matrix scanning microcomputer 40 sequentially activates individual ones of the row drivers 41 to sequentially activate the individual row conductors of the transparent matrix switch. The column conductors of the transparent matrix switch 14 are connected to the inputs of column receivers which sense any signal passing from the row conductors to the column conductors, thereby sensing that pressure has been applied to the sensitive points 17 of intersection in the matrix switch 14. If such a signal is received on one of the column receivers 42, the matrix scanning microcomputer 40 can determine the row and column coordinates of the selected matrix element as the particular number of the row driver 41 element having been activated and the number of the particular column receiver 42 element having received the signal from the respective column conductor of the transparent matrix switch 14. The matrix scanning microcomputer 40 then loads these coordinates into a transfer register 43 and sets a handshake flip-flop 44 so that the control computer 13 knows that the matrix switch has been activated and can then receive the row and column coordinates from the transfer register 43. The control microcomputer 13 knows that the transparent matrix switch has been activated by periodically reading the handshake flip-flop 44, and once the control microcomputer 13 receives the row and column coordinates from the transfer register 43, a data received signal is set to clear the handshake flip-flop 44 for receipt of additional row and column coordinates from the matrix scanning microcomputer 40.

The control computer 13 is organized to control a printing machine 10 by executing a machine control program 45 in its instruction memory 46. The machine control program 45 receives measured values or machine conditions from the printing machine 10 and stores them in a machine condition table 47 in data storage memory 48 of the control computer 13. The machine control program 45 compares the values in the machine condition table 47 to set points in a machine set point table 49 and thereby generates machine adjustments which are stored in a machine adjustment table 50 and transmitted to the printing machine 10. When the machine control program 45 compares the machine condition table 47 to the machine set point table 49, it also determines whether the machine set points, conditions, or adjustments indicate any improper conditions, and if so, warning flags are set in a machine status table 51.

The machine control program 45 is executed periodically as a nonmaskable hardware interrut (NMI). The interrupt occurs at a relatively moderate rate on the order of ten to 30 times a second, as determined by an interrupt timer 52 controlled by the crystal clock 53 of the control computer 13. By operating the machine control program 35 as a hardware interrupt, the control computer 13 can also run an executive program 54 to control the display 15 and to receive operator input from the transparent matrix switch 14. Since the executive program 54 is always executed after the machine control program 45 has completed one full interrupt cycle, the executive program 54 has access to all of the machine parameter tables 47, 49, 50, 51 in the data storage 48. Thus, the machine conditions, set points, adjustments, and warning flags are always available for inspection by the operator through the operator input-output program. Moreover, the machine status table 51 is available to the operator input-output program so that the operator can be apprised of any fault conditions which must be immediately corrected.

To insure that the fault conditions are immediately corrected, the machine control program 45 periodically checks the machine status table 51. If a fault condition exists, the machine control program causes the executive program 54 to be interrupted so that a fault fixing program 58 is immediately executed. To insure that the machine control program 45 does not cause the interruption of the fault fixing program, the fault fixing program 58 is a maskable interrupt routine. The interrupt mask is cleared in the executive program 54 but is set in the fault fixing program 58.

Since the machine control program 45 has interrupt priority, the executive program 54 has a slight difficulty in modifying the machine set point table 49 in response to input from the machine operator. It is imperative that the executive program 54 modifies completely individual set points or groups of setpoints in the machine set point table 49 before the machine control program 45 acts upon the new set points. So that the executive program 54 will not be interrupted in the middle of loading individual set points into the machine set point table 49, the executive program completely loads a set point transfer stack 59 and then loads the stack pointer of the transfer stack 59 to signal the machine control program 45 to accept new set points. The machine control program 45, in other words, does the actual loading or changing of the machine set point table 49.

The executive program 54 uses a number of display building and interactive subroutines 55 corresponding to individual machine functions and individual fault conditions. Each display building and interactive subroutine 55, for example, may generate a different picture on the display 15 or permit the input of different kinds of set points from the machine operator.

It should be noted that the control computer 13 does not use execution time for refreshing the color monitor making up the video display 15. Rather, the control computer 13 merely executes instructions to build or load the desired picture in a video frame buffer 56 which is part of the random access data storage 48 located at a particular set of memory addresses. The control computer 13 has a separate video raster generator and driver 57 scanning the video frame buffer at a high rate to generate the video signal for driving the color monitor 15. The video frame buffer, in other words, stores codes for alphanumeric characters and codes for graphic characters, along with codes for generating particular colors and special codes for flashing the characters or graphic symbols in order to attract the attention of the operator.

Figure 7:
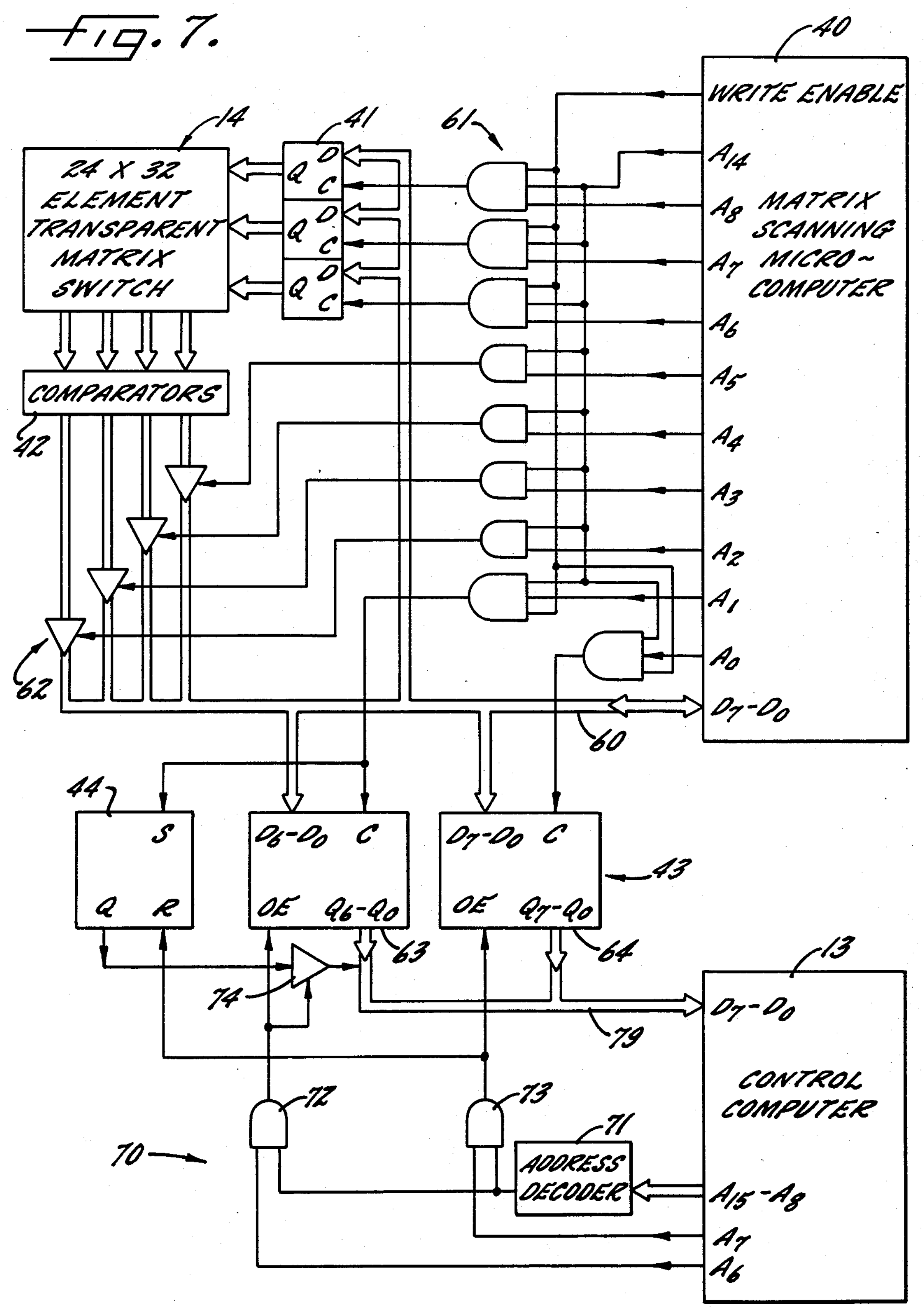
FIG. 7 is a detailed schematic diagram showing the interface between the transparent matrix switch and the control computer.

A more complete electronic schematic of the interface between the control computer 13 and the matrix switch 14 is shown in FIG. 7. The row drivers 41 are comprised of three eight-bit registers receiving data from the eight-bit data bus 60 of the matrix scanning microcomputer 40. Each eight-bit register is addressed at a particular address location determined by a set of AND gates making up an address decoder generally designated 61. To simplify the address decoder 61, individual registers are selected by activating only a particular one of the low order address lines $A_8$–$A_0$. One of the more significant address lines $A_{14}$ is used to enable input or output between the matrix scanning microcomputer 40 and either the transparent matrix switch 14 or the control computer 13. The column receivers 42 are comprised of a set of comparators having thresholds set at the level between the signal levels obtained when the matrix switches are opened and closed, respectively. The outputs of the comparators 42 are connected to the data bus 60 through tristate drivers 62 which are enabled when particular individual assigned addresses are accessed by the matrix scanning microcomputer 40.

The transfer register generally designated 43 is comprised of two eight-bit registers 63 and 64 for passing the row and column coordinates, respectively, for any matrix switch element that is activated by the machine operator. The column coordinate is first passed to the register 64 so that when the row coordinate is passed to the register 63 the handshake flip-flop 54 is also set to indicate to the control computer 13 that the transfer register 43 has been loaded with a new pair of row and column coordinates.

The control and display microcomputer 13 also has an address decoder generally designated 70 which has a separate address decoder 71 and two AND gates 72, 73 for activating the interface circuits to the control computer 13 when a particular combination of high order address bits $A_{15}$–$A_8$ are activated. Two low order address bits $A_6$, $A_7$ are used to activate two AND gates 72, 73 for enabling the reading of the row and column coordinates, respectively, from the transfer register 43. en accessing the transfer register 43, the row register 63 is periodically read until the upper data bit $D_7$ (supplied by an individual tristate buffer 74) is high, indicating that the handshake flip-flop 44 has been set. Then the column register 64 is also read so that both the row and column coordinates for a particular matrix switch element are obtained by the control computer 13.

Figure 8:
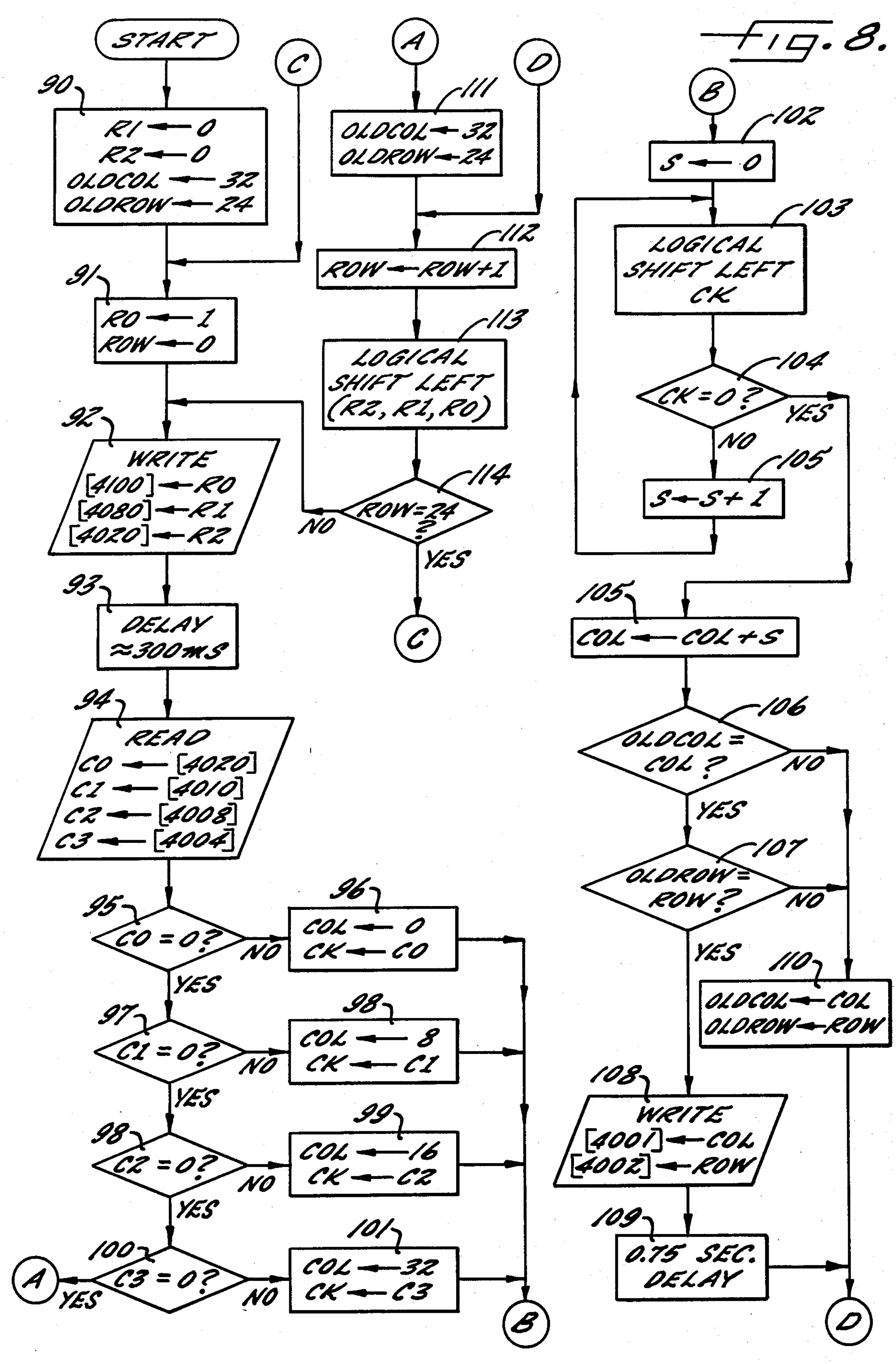
FIG. 8 is a flow chart of the matrix switch scanning procedure performed by the matrix scanning microcomputer in FIGS. 7 and 8.

Shown in FIG. 8 is a flow chart for a procedure executed by the matrix scanning microcomputer 40 to scan the 24×32 element transparent matrix switch 14. This program uses memory registers $R_0$, $R_1$, $R_2$ for activating the three eight-bit registers or comparators 42. Initially, in step 90, memory registers $R_1$ and $R_2$ are set to zero.

In step 91 memory register $R_0$ is set to one and the row coordinate ROW is set to zero in order to activate, in step 92, only the first row conductor of the matrix switch 14. Then a delay of approximately 300 nanoseconds is provided in step 93 so that the comparators 42 may respond to any signal from the matrix switch 14 indicating that a switch element has been closed by the operator. It should be noted that the comparators 42 could respond much faster, but in order to reject fast noise pulses they are purposely slowed down, for example by using filter capacitors shunting the comparator inputs to signal ground. With a 300 nanosecond delay, the entire matrix switch 14 can be scanned at least 100 times a second which is relatively fast.

In step 94 the comparator outputs are transferred to the memory registers $C_0$, $C_1$, $C_2$, and $C_3$. The closure of any switch element can then be detected by testing whether the value of any of these registers is zero, and if so, the particular register can be shifted and tested to determine which bit in the register was set corresponding to the closure of any switch element. Thus, in step 95 memory register $C_0$ is compared to zero. If register $C_0$ is not equal to zero, then a switch closure in columns 0–7 must have occurred, so that in step 96 the column pointer COL is set to an initial value of zero and a shift register CK is set equal to the memory register C0 in anticipation of incrementing the pointer COL as the shift register CK is shifted in order to clear the shift register CK. Similarly, in step 97 the memory register $C_1$ is compared to zero, and if it is not equal to zero, in step 98 the column pointer COL is set to an initial value of eight and the shift register CK is set equal to the memory register $C_1$. Moreover, in step 98 the memory register $C_2$ is tested and the step 99 the pointer COL is set to 16 and the shift register CK is set equal to the memory register $C_2$. Finally, in step 100 the memory register $C_3$ is compared to zero and if it is not equal to zero, then in step 101 the column pointer COL is set equal to 32 and the shift register CK is set equal to the value of memory register $C_3$.

If any of the memory registers $C_0$ is not equal to zero, then the position of the bit in the register which is set is determined by initially setting a bit pointer S to zero in step 102, logically shifting left the shift register CK in step 103, and then testing in step 104 to determine whether the shifting has set the shift register CK to zero. If the particular bit that is set was not shifted out of the shift register CK so as to result in a final value of zero in step 104, then in step 105 the bit pointer S is incremented and the shift register is again shifted in step 103 and tested in step 104. Thus, when step 104 finds that the shift register CK is equal to zero, the value of the bit pointer S will indicate the initial position of the set bit in the shift register CK. Hence, in step 105 the bit pointer S is added to the initial value of the column pointer COL to determine the column position of a particular bit which was set. At this time the pointer ROW and the pointer COL identify the row and column coordinates, respectively, of the particular matrix switch that was closed by the operator.

In order that fast noise pulses are not falsely received as switch closures, the matrix scanning microcomputer checks to determine whether two successive scans result in the same row and column coordinates. In other words, a matrix switch element must be closed from between one and two scanning periods before a switch closure will actually be detected and the presence of an operator input signalled to the control computer 13. The time delay does not cause any significant problems since the operator is presumed to press the matrix switch for longer than ten to 20 milliseconds. To determine whether the same row and column coordinates were obtained for an immediately preceding scan, the column coordinate COL is compared in step 106 to the previous column coordinate OLDCOL and in step 107 the row coordinate ROW is compared to the immediately preceding row coordinate OLDROW. If the present coordinates match the previous coordinates, then in step 108 the row and column coordinates are written to the transfer registers 63 and 64. (FIG. 7). Then in step 109 the matrix scanning microcomputer waits for a delay of $\frac{3}{4}$ of a second so that multiple switch closures are not detected. However, the delay of $\frac{3}{4}$ of a second is long enough so that if the operator wants to enter the same input a number of times, he can do so by continuing to depress a particular switch element for more than $\frac{3}{4}$ of a second. This could be useful, for example, for keying in the same number on the virtual keyboard 30 (FIG. 4) a number of times in succession.

If the current coordinates did not match the old coordinates in steps 106 and 107, then the old coordinates are updated by being set to the present coordinates in step 110. The old coordinates are initially set in step 90 to values of 32 and 24 for the column pointer COL and row pointer ROW, respectively, so that a match of present coordinates to all coordinates cannot occur after the detection of only one initial switch closure. Note that any detected column coordinate must have a value of less than 32 and any detected row coordinate must have a value of less than 24. Similarly, if all of the memory registers $C_0$–$C_3$ were found to be equal in steps 95, 97, 98, and 100, then in step 111 the old column pointer OLDCOL is also set to a value of 32 and the old row pointer OLDROW is set to a value of 24.

In order to scan the next row of the matrix switch 14, in step 112 the row pointer ROW is incremented and in step 113 all of the memory registers $R_2$, $R_1$, $R_0$ are logically shifted left with the carry out from register $R_0$ fed to the carry in of register $R_1$, and the carry out of register $R_1$ fed to the carry in of register $R_2$. In other words, in step 113 the particular bit that is set in the 24-bit shift register formed by concatenating the eight bit registers $R_2$, $R_1$, $R_0$ is shifted left in order to prepare for the activation of the next row of the matrix switch 14. However, if all of the rows of the matrix switch 14 have already been selected, this bit will be shifted out of the shift register. Rather than test to determine whether all of the registers $R_0$, $R_1$, $R_2$ are zero, it is easier to test whether the row pointer ROW is equal to 24 in step 114.

If it is not equal to 24, then the next row of the matrix switch can be activated in step 92 by writing out the values of the memory registers $R_0$, $R_1$, and $R_2$ to the row drivers 41 (FIG. 7). However, if the row pointer is equal to 24 in step 114, then execution can jump to step 91 to again set the row pointer ROW to zero and to set the memory register $R_0$ to one. This completes the description of the procedure executed by the matrix scanning microcomputer 40.

Figure 9:
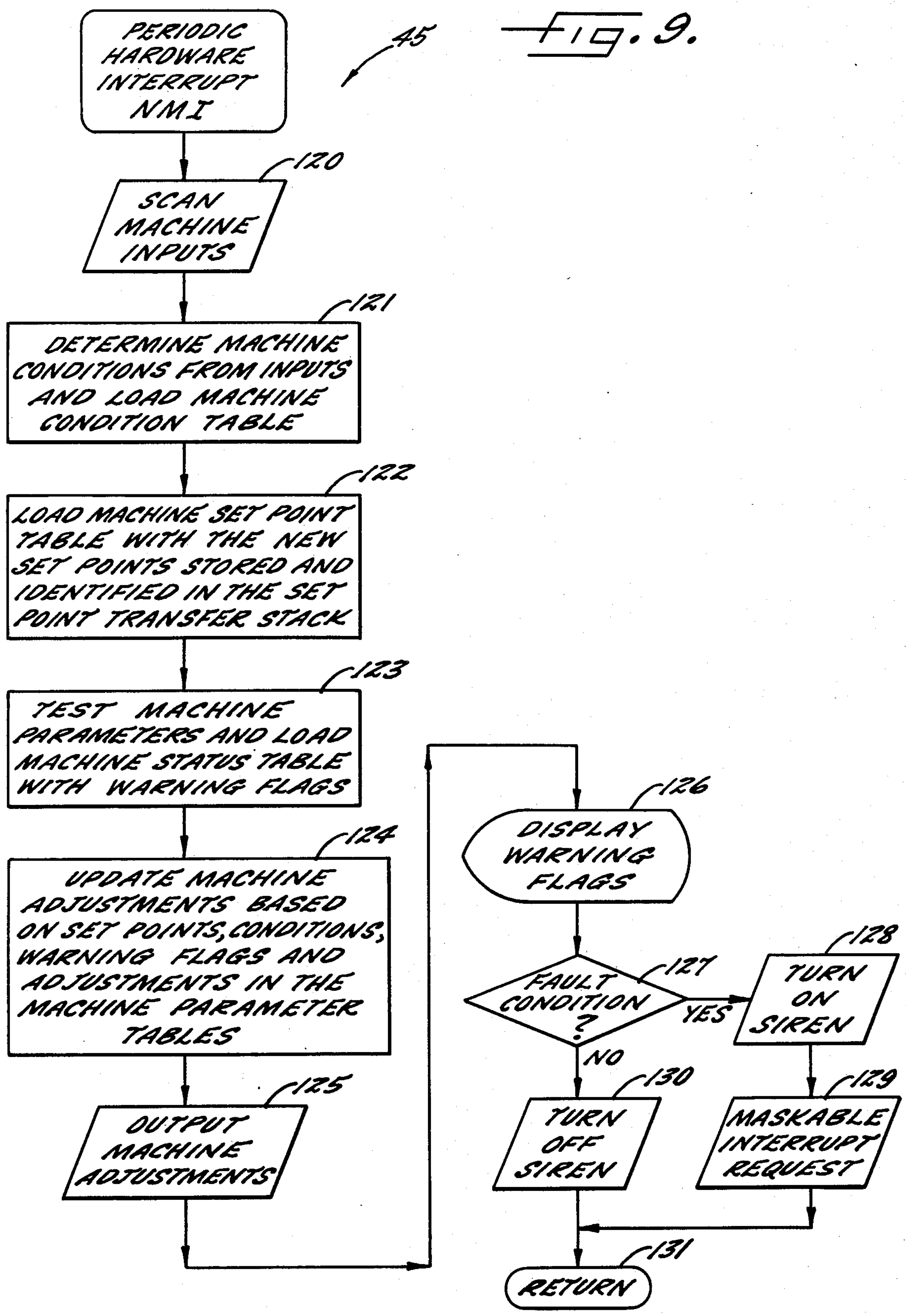
FIG. 9 is a flow chart of the nonmaskable machine control program executed by the control computer of FIGS. 6 and 7.

A flow chart for the machine control program 45 is shown in FIG. 9. After each periodic hardware interrupt, the machine inputs are scanned in step 120 and in step 121 machine conditions are determined from the machine inputs and the machine conditions are loaded into the machine condition table 47.

In step 122, any new machine set points temporarily stored and identified in the set point transfer stack 59 are loaded into the set point table 49 at the identified table addresses. In order to determine any fault conditions, the machine parameters stored in the machine condition table 47, the machine set point table 49, the machine adjustment table 50, and the machine status table 51 are inspected and compared in step 123 and the presence of any fault condition is indicated by setting a warning flag in the machine status table 51.

Similarly, in the control determining step 124 the machine adjustments in the machine adjustment table 50 are updated based on the set points, conditions, warning flags and previous adjustments in the machine parameter tables 47, 49, 50, 51. For the case of zonal ink density as illustrated in FIG. 4, the set points correspond to predetermined ink density values adjusted by the zonal offsets 32, the machine conditions correspond to zonal ink density measured on the densitometer table 12 (FIG. 1) and the sensed positions of the ink keys or metering elements in the printing machine 10, and the machine adjustments corresponds to the commanded position or drive signal to the ink adjusting keys or metering elements. The commanded adjustments to the ink keys, for example, are set proportional to the differences between the ink density set points and the measured ink densities for the respective printing zones. Warning flags may be set, for example, if there is an excessive deviation between the desired ink density set points and the measured ink density values, or if the commanded adjustments to the ink keys substantially deviate from the measured positions of the ink density keys. In step 125, the machine adjustments in the machine adjustment table 50 are transmitted to the printing machine to command the desired adjustments.

The final task of the machine control program is to initiate the correction of any fault conditions. If any warning flags are set, they are displayed in step 126, for example by displaying a yellow border 27 around the corresponding machine status area indicator 24 (FIG. 4). Some of the warning flags may in fact indicate fault conditions that require immediate operator attention. These particular flags are tested in step 127 and if they are found to be set, indicating a fault condition, a siren is turned on in step 125, and a maskable interrupt is requested in step 126. If a fault condition does not exist, the siren is turned off in step 130.

In step 129, a maskable interrupt is requested rather than executed since the executive program 54 rather than the machine control program 25 should be interrupted. Moreover, the fault fixing program 58 must be a maskable interrupt routine so that it is not interrupted by successive cycles through the machine control program.

To ensure that the machine control program 45 does not interrupt itself, step 128 could entail the enabling of an external hardware delay and one-shot to trigger a maskable interrupt input line to the control computer 13. Preferably, however, the same result is achieved in software by inspection and manipulation of the interrupt stack which stores previous cndition codes, registers and return vectors during subroutine calls and interrupts in order to service subroutine and interrupt returns. The most recent interrupt mask bit stored in this interrupt stack is tested, and if it is not set, a "jump" or "go to" instruction is executed so that execution is transferred to the fault fixing program 58.

Figure 10:
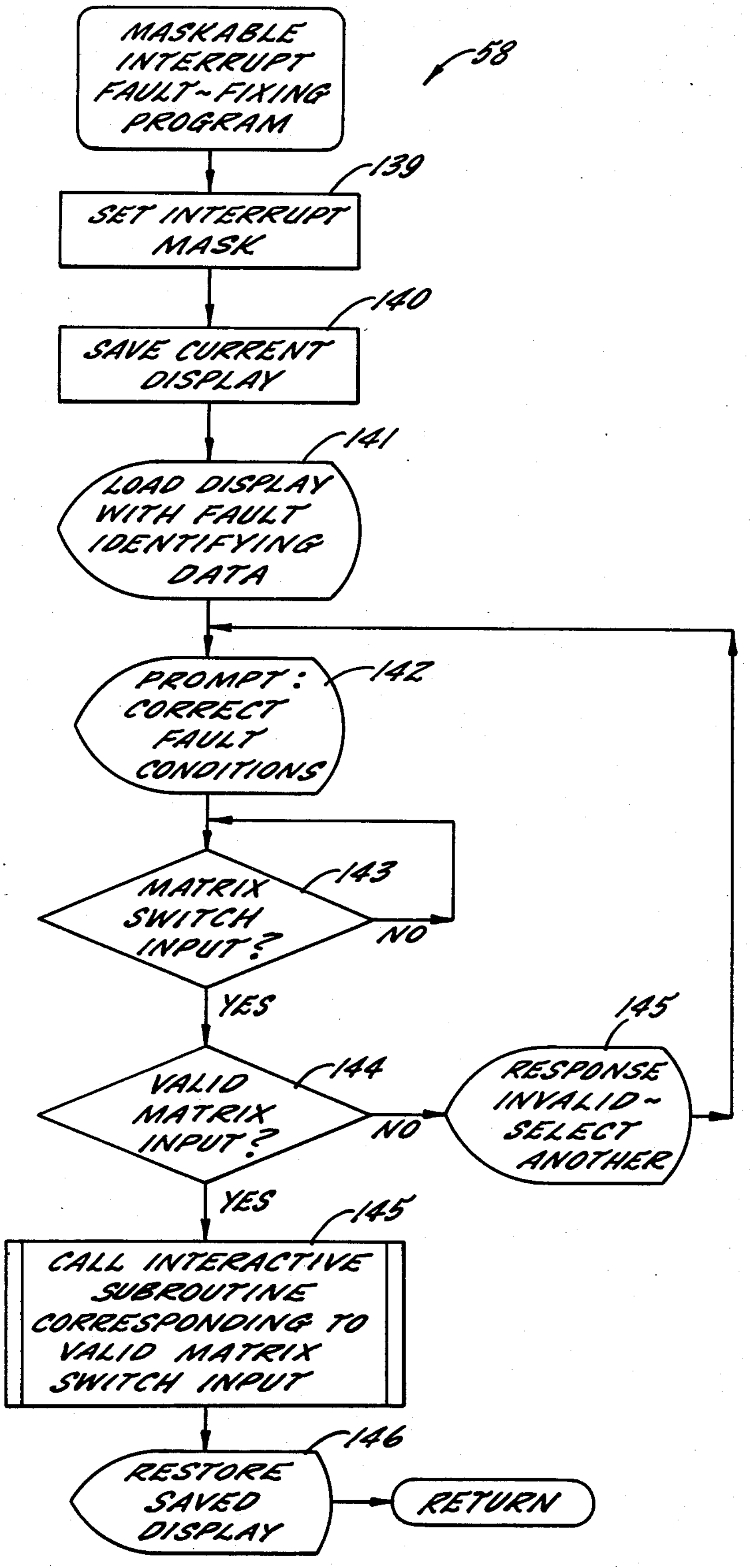
FIG. 10 is a flow chart of the maskable interrupt routine executed by the control computer after the machine control program of FIG. 9 detects the occurrence of a fault condition.

A flow chart for the maskable interrupt fault fixing program 58 is shown in FIG. 10. First, in step 139, the interrupt mask is set to disable successive maskable interrupts by the machine control program 45. In step 140, the current interactive display or data in the video frame buffer 56 is temporarily stored in the data storage 48 in order that execution may return and properly continue in the executive program 54 after the fault condition has been remedied.

To remedy the fault conditions, the display is loaded in step 141 with fault identifying data in order to indicate the nature of the fault. In step 141, for example, the graphic symbol 24 on the machine diagram in the location corresponding to the machine status area of the fault condition is blinked on and off by loading the video frame buffer 56 with the code for blinking the graphic symbol 24. Then in step 142 a prompting message is written to the prompting area 21 of the video frame buffer 56. It should be noted, however, that the fact that the current interactive display area 23 is changed in step 141 coincident with the appearance of a blinking graphic symbol 24 on the machine diagram 25, the operator instinctively knows that a fault condition is present and must be remedied. Thus, in step 143, the fault fixing program 58 scans the row and column input by reading the transfer registers 43 until a matrix switch input is detected. If this matrix input is invalid, as tested in step 144, the operator is instructed in step 145 to activate a different switch element 17. It should be noted that activation of a switch element 17 corresponding to a blinking graphic symbol 24 on the machine diagram 25 should always be a valid matrix switch input by which the machine operator may request that the set points fbr that particular machine status area are to be changed.

The usual response to a valid matrix input in step 144 is the calling of an interactive subroutine 55 in step 145 corresponding to the valid matrix switch input. A particular interactive subroutine 55, for example, generated the interactive display area 23 of FIG. 4 in response to the operator's selection of the matrix element 17 above the graphic symbol 24 on the machine diagram 25. The interactive subroutine 55 also allows the operator to input data to change the set points, as was discussed above in conjunction with the particular interactive display 23 in FIG. 4. Thus, the interactive subroutine 55 called in step 145 should at least eliminate the fault condition associated with the valid matrix input tested in step 144. In anticipation of returning to the executive program, the display that was saved in step 140 is restored in step 146. This completes the execution of the software interrupt and hopefully all fault conditions were cleared by the interactive subroutine in step 145. This is not always the case, since there could be multiple fault conditions at a plurality of machine status areas. Note that any persistent fault condition will again be detected in step 124 (FIG. 9) and the interrupt program of FIG. 10 will be re-executed any number of times until all of the fault conditions are remedied.

Figure 11:
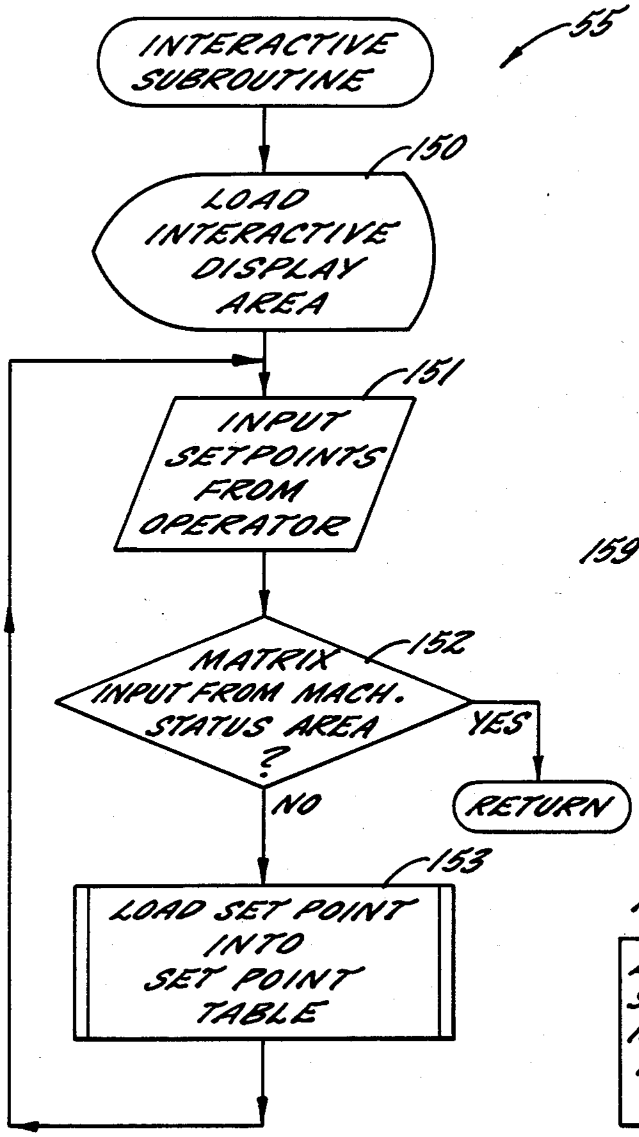
FIG. 11 is a flow chart of an interactive subroutine representing, in general, one of the many operating sequences for displaying and entering changes in the machine control parameters.

A generalized flow chart for an interactive subroutine 55 (of the kind called in step 145 of FIG. 10) is shown in FIG. 11. In step 150 the interactive display area is loaded with certain machine parameters and options for the input of set points from the operator. See, for example, the interactive display area generally designated 23 in FIG. 4 corresponding to the zonal offset set points for ink density. Then in step 151 set points are received from the operator. If the operator activates a matrix switch element 24 on the machine diagram 25, however, the operator can terminate the current interactive subroutine by in effect requesting to supervise or control a new machine status area. Thus, in step 152 the matrix input received in step 151 is tested to determine whether it corresponds to a set point or, whether it corresponds to a matrix element in the machine diagram area 22. If the matrix input was from the interactive area 23 and thus was a set point, then in step 153 the set point is loaded into the set point table 49. If, however, the matrix input was from the machine status area, execution returns to the calling program.

Figure 12:
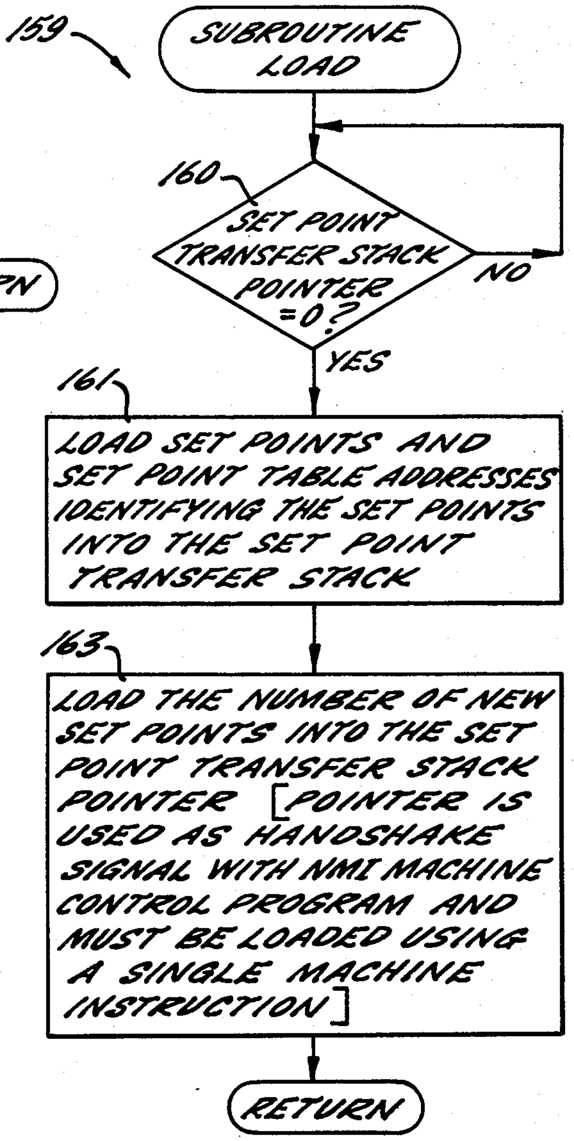
FIG. 12 is a flow chart of the load subroutine for loading new set points into a transfer stack so that the set points may be transferred to the machine control program.

Shown in FIG. 12 is a flow chart of the load subroutine 159 called in step 153 of FIG. 11. The load subroutine 159 prepares the set point transfer stack 59 for the passage of new set points to the machine control program 45 so that a complete set point or group of related set points are written into the set point table 49 between successive nonmaskable interrupts executing the machine control program 45. In other words, the load subroutine ensures that the machine control program 45 will always have a complete and current set of set points to work with.

The load subroutine first waits for the last batch of set points to be loaded into the set point table 49 so that the transfer stack 59 will be empty and ready to receive a new batch of set points. Thus, in step 160 the load subroutine 159 test the stack pointer of the set point transfer stack to see if it is zero, indicating that there are no set points in the stack. If the stack pointer is not zero, step 160 is repeated until the machine control program (in step 122 FIG. 9) sets the stack pointer to zero after transferring the entire stack 59 to the set point table. Then in step 161 the set point or group of set points and the set point table addresses identifying the particular set points are written into the set piont table 49. In other words, the transfer stack 59 is a stack of two dimensional vectors, each vector consisting of a set point and a respective set point table address identifying the respective set point. It should be noted, however, that the final machine instruction for step 163 loads the number of set points in the batch into the transfer stack pointer, thereby using a single machine instruction to change the pointer from zero to the number of set points in the batch. This is necessary since the pointer is used as the handshake between the load subroutine 159 and the machine control program 45, and the nonmaskable interrupt could occur at any time in relation to execution of the load subroutine. Once the pointer is set to a nonzero value, execution of the load subroutine is finished.

Figure 13:
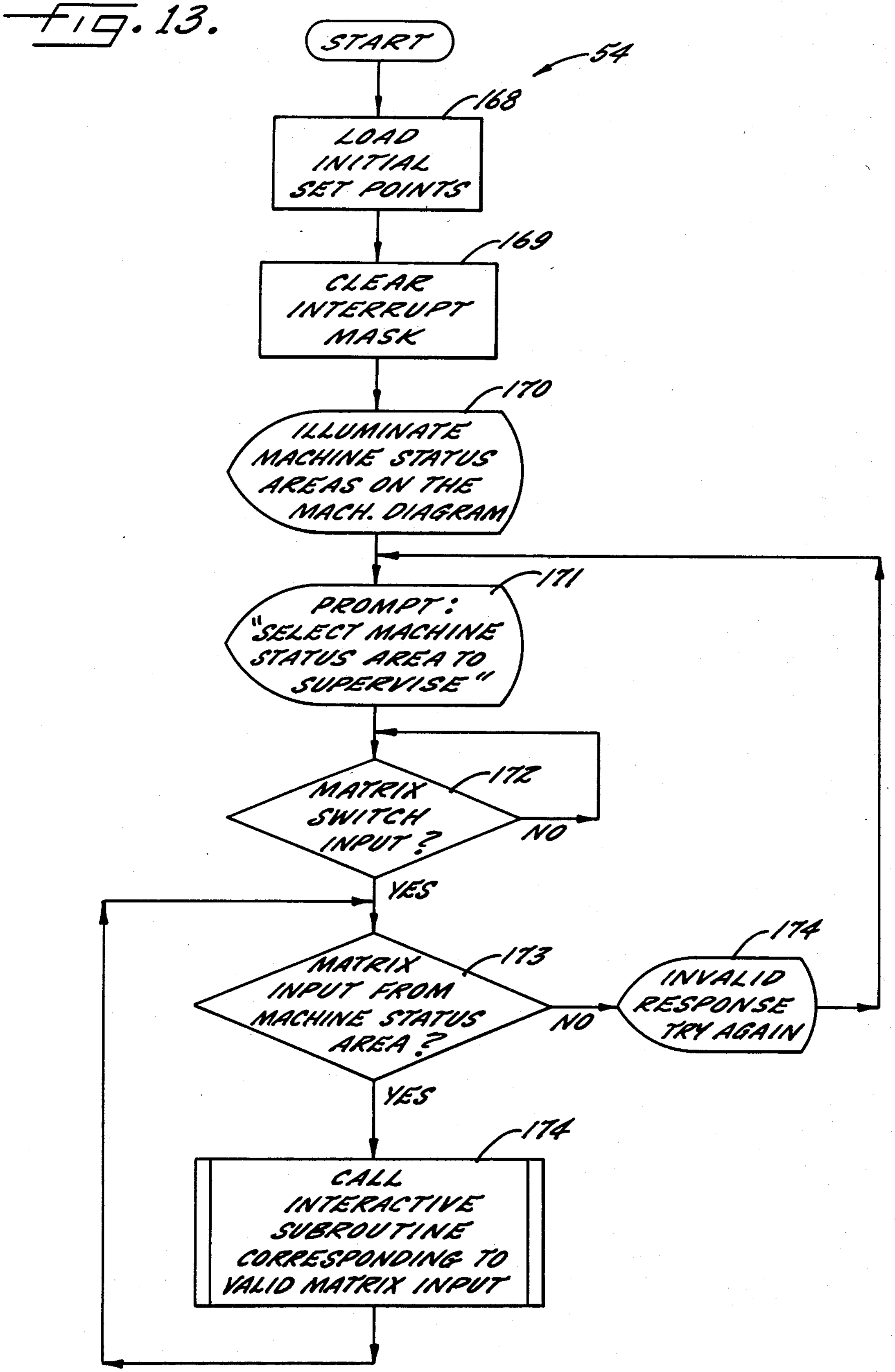
FIG. 13 is a flow chart of an executive program for the control computer.

A flow chart of the executive program 54 for operator input-output is shown in FIG. 13. The executive program 54 begins after power is applied to the control computer or after a reset signal generated when the printing machine 10 is restarted after a dead man stop. In step 169 a predetermined set of initial set points from instruction memory 46 are loaded into the machine set point table 49 using the load subroutine 159 (FIG. 12). The last set point loaded, for example, is a set point enabling the printing machine 10 to restart its printing operations. To enable the faultfixing maskable interrupt program 58, the interrupt mask is cleared in step 170. To designate the machine status areas on the machine diagram 22, in step 170 the graphic symbols 24 (FIG. 4) are written into the video frame buffer 52 (FIG. 6) at frame buffer addresses corresponding to the locations of the status areas on the machine diagram 22. Then in step 171 an initial prompting message is written to the prompting area 21 (FIG. 4) of the video frame buffer 56. This prompt, for example, tells the machine operator to select a machine status area to supervise. In other words, the operator is directed to select a desired graphic symbol 24 on the machine diagram 22 to supervise a desired machine status area.

The executive program waits in step 172 for a matrix switch input and after a matrix switch input is received the executive program, in step 173, tests the row and column coordinates (ROW, COL) of the matrix input to determine if the matrix input was from a machine status area. If the matrix input was not from a machine status area, the operator is told in step 174 that the response was invalid. If, however, the matrix input was from a machine status area, then in step 174 the interactive subroutine (FIG. 11) corresponding to the valid matrix input is called. The machine operator can then monitor the machine parameters or enter new set points. By selecting a different machine status area, the operator terminates a current interactive subroutine call and, after the new selection is tested in step 173, another interactive subroutine corresponding to the newly selected machine status area is called. Thus, the executive program of FIG. 13 provides a means for successive calling of interactive subroutines. In other words, these display building and interactive subroutines 55 perform most of the work permitting the machine operator to inspect machine parameters and change machine set points.

In view of the above, a remote control terminal for a printing machine has been disclosed having a single central display for indicating all machine functions and accepting operator input of all the control information and which is easily used by a machine operator of ordinary skill. The control terminal may use a low resolution color monitor yet also have a machine diagram template indicating printing machine areas in high resolution pictorial format. Control of the printing machine is a hierarchal process starting from the selection of a machine status area indicated on the machine diagram. Fault signals, however, are indicated directly and automatically for immediate operator attention. Selected correction possibilities are offered so that the operator does not need to investigate the possible location or cause of the defect. Machine functions and subsystems are color coded on the machine diagram. Similarly, machine data is color coded to distinguish input areas, set points, measured values, adjustments, and legends and messages. Thus, it is not necessary for the machine operator to observe all of the machine parameters, and instructions or inputs cannot be fed unchecked or accidentally to the control system. In other words, an improved method has been disclosed for supervising printing machine functions from a central location wherein a machine operator of ordinary skill and without extensive training is intuitively guided to specific operator sequences providing access to subsets of related machine parameters.

What is claimed is:

1. A control terminal for the remote computer control of a printing machine, the control terminal having a video display for computer-generated output and a transparent pressure-sensitive sensor having a plurality of pressure-sensitive points overlaid on the video display for input from a machine operator to a remote control computer, wherein the improvement comprises a graphics template having at least part of a machine diagram providing a pictorial representation of the printing machine, said template also being overlaid on the video display, the video display having means for selectively generating visually perceptible symbols aligned with certain respective machine status areas on the part of the machine diagram on the graphics template, said machine status areas pictorially representing specific respective components of the printing machine, and the pressure-sensitive sensor having pressure-sensitive points aligned with the machine status areas; and means for initiating and conducting a respective interactive input-output procedure between the control terminal and the machine operator corresponding to a selected machine status area but using a common portion of the video display and pressure-sensitive sensor separate from the machine diagram after the operator presses a pressure-sensitive point aligned with the selected machine status area.

2. The control terminal as claimed in claim 1 wherein distinct machine status areas are provided for inking, register, and sheet travel machine functions, and a plurality of machine status areas are provided for each function.

3. The control terminal as claimed in claim 2 further comprising means for generating distinct colors on the video display, each color being aligned with the machine status areas provided for a respective different one of the machine functions.

4. The control terminal as claimed in claim 3 further comprising means for activating the video display to display machine parameters corresponding to the machine function for the respective machine status area aligned with a pressure-sensitive point touched by the machine operator.

5. The control terminal as claimed in claim 4 further comprising means for generating distinct colors on the video display for distinguishing machine conditions and machine set points.

6. The control terminal as claimed in claim 3 further comprising means for activating the video display to indicate input areas for receiving machine set points corresponding to the machine function for the respective machine status area aligned with a pressure-sensitive point touched by the machine operator.

7. The control terminal as claimed in claim 1 further comprising means for driving the video display to selectively generate visually perceptible symbols that indicate alarm conditions and are aligned with machine status areas representing components of the printing machine which have faulty operation.

8. The control terminal as claimed in claim 7 wherein the remote control computer executes a computer program defining a sequence of permissible data input from the operator, including a first sequence of data input executed in the absence of any occurrence of said faulty operation, and different sequences of data input for the entry of machine set points corresponding to the respective machine status areas in the event of faulty operation, and further comprising means for automatically interrupting the execution of the first sequence of data input upon the occurrence of the faulty operation and thereupon executing the respective different sequences of data input for the entry of machine set points corresponding only to the machine status areas representing components of the printing machine which have faulty operation.

9. The control terminal as claimed in claim 8 wherein said execution of each respective different sequence of data input first requires the machine operator to press a pressure-sensitive point aligned with the respective machine status area indicated as representing components of the printing machine which have faulty operation, and thereupon permits the entry of machine set points corresponding only to that particular machine status area.

10. The control terminal as claimed in claim 9 wherein the required entry of machine set points corresponding only to that particular machine status area continues until the fault is corrected or until the operator presses a pressure-sensitive point aligned with another indicated machine status area representing components of the printing machine which have faulty operation.

11. The control terminal as claimed in claim 2 further comprising means for activating the video display to display machine parameters corresponding to the machine function for the respective machine status area aligned with a pressure-sensitive point touched by the machine operator.

12. The control terminal as claimed in claim 11 further comprising means for generating distinct colors on the video display for distinguishing machine conditions and machine set points.

13. The control terminal as claimed in claim 1 further comprising means for rejecting input from the machine operator from pushed pressure-sensitive points that are not aligned with machine status areas that are aligned with respective ones of said visually perceptible symbols selectively generated by the video display.

14. The control terminal as claimed in claim 13 further comprising means for activating the video display to display machine parameters corresponding to the machine function for the respective machine status area aligned with a pressure-sensitive point touched by the machine operator.

15. The control terminal as claimed in claim 13 further comprising means for activating the video display to indicate input areas for receiving machine set points corresponding to the machine function for the respective machine status area aligned with a pressure-sensitive point touched by the machine operator.

16. The control terminal as claimed in claim 1 further comprising means for activating the video display to display machine parameters corresponding to the machine function for the respective machine status area aligned with a pressure-sensitive point touched by the machine operator.

17. The control terminal as claimed in claim 16 further comprising means for activating the video display to indicate input areas for receiving machine set points corresponding to the machine function for the respective machine status area aligned with a pressure-sensitive point touched by the machine operator.

18. The control terminal as claimed in claim 16 further comprising means for generating distinct colors on the video display for distinguishing machine conditions and machine set points.

19. The control terminal as claimed in claim 1 further comprising means for activating the video display to indicate input areas for receiving machine set points corresponding to the machine function for the respective machine status area aligned with a pressure-sensitive point touched by the machine operator.

20. The control terminal as claimed in claim 19 further comprising means for driving the video display for illuminating the pressure-sensitive points for operator input of machine set points with a distinguishing color.

21. The control terminal as claimed in claim 2 further comprising means for rejecting input from the machine operator from pushed pressure-sensitive points that are not aligned with machine status areas that are aligned with respective ones of said visually perceptible symbols selectively generated by the video display.

22. The control terminal as claimed in claim 2 further comprising means for activating the video display to indicate input areas for receiving machine set points corresponding to the machine function, for the respective machine status area aligned with to a pressure-sensitive point touched by the machine operator.

23. The control terminal as claimed in claim 1 wherein the graphics template is easily replaceable with a different graphics template.

24. The control terminal as claimed in claim 2 wherein the graphics template is easily replaceable with a different graphics template.

25. The control terminal as claimed in claim 2 further comprising means for driving the video display to selectively generate visually perceptible symbols that indicate alarm conditions and are aligned with machine status areas representing components of the printing machine which have faulty operation.

26. A control terminal for the remote computer control of a printing machine having distinct inking, register, and sheet travel machine functions, the control terminal having a video display for computer-generated output and a transparent pressure-sensitive sensor having a plurality of pressure-sensitive points overlaid on the video display for input from a machine operator to a remote control computer, wherein the improvement comprises means for presenting a machine diagram on the video display, said machine diagram providing a pictorial representation of the printing machine, the video display having means for selectively generating visually perceptible symbols aligned with certain respective machine status areas on the machine diagram, said machine status areas pictorially representing specific respective components of the printing machine, the pressure-sensitive sensor having pressure-sensitive points aligned with the machine status areas, and wherein distinct machine status areas are provided for each of said inking, register, and sheet travel machine functions;

distinct means for selectively receiving operator input and displaying data for each of the respective inking, register, and sheet travel machine functions by displaying said data on a common area of said video display apart from said machine diagram and receiving said operator input from selectively indicated pressure-sensitive points aligned with said common area; and means for (1) operating said means for presenting said machine diagram, (2) responding to an operator's pressing of an indicated pressure-sensitive point aligned with a selected machine status area on said machine diagram by operating a selected one of said distinct means for a selected one of said machine functions corresponding to the pressed pressure-sensitive point on the machine diagram to thereby conduct a corresponding interactive input-output procedure between the control terminal and the machine operator which uses said common portion of the video display, and (3) upon completion of said corresponding interactive input-output procedure, again operating said means for presenting said machine diagram, so that the machine operator is guided through specific operating sequences providing systematic organization of data and acceptance of operator input after the operator selects an indicated position on the machine diagram.

27. The control terminal as claimed in claim 26 wherein interactive input and output of machine parameters occurs only after operator selection of a particular machine status area on the machine diagram, which is used only for the selection of specific sequences for conducting the interactive input-output

28. The control terminal as claimed in claim 27 further comprising means for generating distinct colors on the video display, each color being aligned with the machine status areas provided for a respective different one of the machine functions.

29. The control terminal as claimed in claim 28 further comprising means for activating the video display to display machine parameters corresponding to the machine function for the respective machine status area aligned with a pressure-sensitive point touched by the machine operator.

30. The control terminal as claimed in claim 29 further comprising means for generating distinct colors on the video display for distinguishing machine conditions and machine set points.

31. The control terminal as claimed in claim 28 further comprising means for activating the video display to indicate input areas for receiving machine set points corresponding to the machine function for the respective machine status area aligned with a pressure-sensitive point touched by the machine operator.

32. The control terminal as claimed in claim 27 further comprising means for activating the video display to display machine parameters corresponding to the machine function for the respective machine status area aligned with a pressure-sensitive point touched by the machine operator.

33. The control terminal as claimed in claim 32 further comprising means for generating distinct colors on the video display for distinguishing machine conditions and machine set points.

34. The control terminal as claimed in claim 26 further comprising means for driving the video display to indicate machine status areas representing components of the printing machine which have faulty operation.

35. The control terminal as claimed in claim 34 wherein the remote control computer executes a computer program defining a sequence of permissible data input from the operator, including a first sequence of data input executed in the absence of any occurrence of said faulty operation, and different sequences of data input for the entry of machine set points corresponding to the respective machine status areas in the event of faulty operation, and further comprising means for automatically interrupting the execution of the first sequence of data input upon the occurrence of the faulty operation and thereupon executing the respective different sequences of data input for the entry of machine set points corresponding only to the machine status areas representing components of the printing machine which have faulty operation.

36. The control terminal as claimed in claim 35 wherein said execution of each respective different sequence of data input first requires the machine operator to press a pressure-sensitive point aligned with the respective machine status area indicated as representing components of the printing machine which have faulty operation, and thereupon permits the entry of machine set points corresponding only to that particular machine status area.

37. The control terminal as claimed in claim 36 wherein the required entry of machine set points corresponding only to that particular machine status area is continuous until the fault is corrected or until the operator presses a pressure-sensitive point corresponding to another indicated machine status area representing components of the printing machine which have faulty operation.

38. The control terminal as claimed in claim 27 further comprising means for rejecting input from the machine operator from pushed pressure-sensitive points that are not aligned with machine status areas that are aligned with respective ones of said visually perceptible symbols selectively generated by the video display.

39. The control terminal as claimed in claim 27 further comprising means for activating the video display to indicate input areas for receiving machine set points corresponding to the machine function for the respective machine status area aligned with a pressure-sensitive point touched by the machine operator.

40. The control terminal as claimed in claim 27 wherein the means for presenting the machine diagram on the video display comprises a graphics template overlaid on the display providing at least part of the machine diagram and having a resolution greater than the resolution of the computer-generated portion of the video display.

41. The control terminal as claimed in claim 27 further comprising means for driving the video display to indicate machine status areas representing components of the printing machine which have faulty operation.

42. The control terminal as claimed in claim 26 further comprising means for rejecting input from the machine operator from: pushed pressure-sensitive points that are not aligned with machine status areas that are aligned with respective ones of said visually perceptivle symbols selectively generated by the video display.

43. The control terminal as claimed in claim 42 further comprising means for activating the video display to display machine parameters corresponding to the machine function for the respective machine status area aligned with a pressure-sensitive point touched by the machine operator.

44. The control terminal as claimed in claim 42 further comprising means for activating the video display to indicate input areas for receiving machine set points corresponding to the machine function for the respective machine status area aligned with a pressure-sensitive point touched by the machine operator.

45. The control terminal as claimed in claim 26 further comprising means for activiating the video display to display machine parameters corresponding to the machine function for the respective machine status area aligned with a pressure-sensitive point touched by the machine operator.

46. The control terminal as claimed in claim 45 further comprising means for activating the video display to indicate input areas for receiving machine set points corresponding to the machine function for the respective machine status area aligned with a pressure-sensitive point touched by the machine operator.

47. The control terminal as claimed in claim 45 further comprising means for generating distinct colors on the video display for distinguishing machine conditions and machine set points.

48. The control terminal as claimed in claim 26 further comprising means for activating the video display to indicate input areas for receiving machine set points corresponding to the machine function for the respective machine status area aligned with a pressure-sensitive point touched by the machine operator.

49. The control terminal as claimed in claim 48 further comprising means for driving the video display for illuminating the pressure-sensitive points for operator input of machine set points with a distinguishing color.

50. The control terminal as claimed in claim 26 wherein the means for presenting the machine diagram on the video display comprises a graphics template overlaid on the display providing at least part of the machine diagram and having a resolution greater than the resolution of the computer-generated portion of the video display.

* * * * *